United States Patent
Okumura et al.

(10) Patent No.: US 11,662,471 B2
(45) Date of Patent: May 30, 2023

(54) WATER VAPOR OBSERVATION DEVICE AND WATER VAPOR OBSERVATION METHOD

(71) Applicant: Furuno Electric Co., Ltd., Hyogo (JP)

(72) Inventors: Shigeaki Okumura, Nishinomiya (JP); Yuya Takashima, Nishinomiya (JP); Masahiro Minowa, Nishinomiya (JP); Shuhei Inoue, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 105 days.

(21) Appl. No.: 17/452,716

(22) Filed: Oct. 28, 2021

(65) Prior Publication Data

US 2022/0050212 A1 Feb. 17, 2022

Related U.S. Application Data

(63) Continuation of application No. PCT/JP2020/016415, filed on Apr. 14, 2020.

(30) Foreign Application Priority Data

May 13, 2019 (JP) .............................. JP2019-090397

(51) Int. Cl.
*G01S 19/14* (2010.01)
*G01N 22/04* (2006.01)

(52) U.S. Cl.
CPC .............. *G01S 19/14* (2013.01); *G01N 22/04* (2013.01)

(58) Field of Classification Search
CPC ................................. G01S 19/14; G01N 22/04
(Continued)

(56) References Cited

U.S. PATENT DOCUMENTS

2014/0035779 A1 2/2014 Solheim

FOREIGN PATENT DOCUMENTS

| CN | 107180128 A | * | 9/2017 | ............. G06F 30/20 |
| CN | 108416031 A | | 8/2018 | |

(Continued)

OTHER PUBLICATIONS

ISA Japan Patent Office, International Search Report Issued in Application No. PCT/JP2020/016415, dated Jun. 23, 2020, WIPO, 4 pages.

*Primary Examiner* — Harry K Liu
(74) *Attorney, Agent, or Firm* — Alleman Hall Creasman & Tuttle LLP

(57) ABSTRACT

A water vapor observation device includes a water vapor index acquisition module which acquires a water vapor index calculated based on radio wave intensities of at least two frequencies out of radio waves received by a microwave radiometer, a global navigation satellite system (GNSS) precipitable water vapor acquisition module which acquires a GNSS precipitable water amount calculated based on an atmospheric delay of a GNSS signal received by a GNSS receiver, a correlation data generation module which generates correlation data between the water vapor index and the GNSS precipitable water amount based on the water vapor index and the GNSS precipitable water amount at a plurality of time points during a predetermined period, and a precipitable water vapor calculation module which calculates a precipitable water amount based on the correlation data from the water vapor index obtained based on the microwave radiometer.

20 Claims, 4 Drawing Sheets

(58) Field of Classification Search
USPC .................................................. 342/357.52
See application file for complete search history.

(56) References Cited

FOREIGN PATENT DOCUMENTS

| | | | | |
|---|---|---|---|---|
| CN | 109001382 A | * | 12/2018 | ......... G01N 33/0036 |
| JP | 2008014939 A | | 1/2008 | |
| JP | 2010060444 A | | 3/2010 | |
| JP | 2017207459 A | | 11/2017 | |
| JP | 2019015517 A | | 1/2019 | |
| WO | WO-2020230501 A1 | * | 11/2020 | ............. G01N 22/04 |

* cited by examiner

WATER VAPOR OBSERVATION DEVICE AND WATER VAPOR OBSERVATION METHOD

CROSS-REFERENCE TO RELATED APPLICATION(S)

This application is a continuation of PCT International Application No. PCT/JP2020/016415, which was filed on Apr. 14, 2020, and which claims priority to Japanese Patent Application Ser. No. 2019-090397 filed on May 13, 2019, the entire disclosures of each of which are herein incorporated by reference for all purposes.

TECHNICAL FIELD

The present disclosure relates to a water vapor observation device and a water vapor observation method.

BACKGROUND

It is known that a global navigation satellite system (GNSS) receiver and a microwave radiometer are used for water vapor observation.

The water vapor observation by the GNSS receiver utilizes multi-frequency radio waves emitted from a satellite. If radio waves of two or more different frequencies and radio waves radiated from four or more satellites can be received, an amount of delay of the radio waves can be captured. The amount of radio wave delay corresponds to an amount of water vapor, and the amount of water vapor can be observed. Water vapor observation using a GNSS (Global Navigation Satellite System; global positioning satellite system) can be stably measured without calibration. However, since the GNSS uses various satellites arranged in the whole sky, it is possible to obtain an average value of water vapor over a wide range in the sky, but it is not possible to observe water vapor in a local range.

The water vapor observation using a microwave radiometer utilizes radio waves emitted from water vapor in the atmosphere and measures radio waves from water vapor and clouds. Due to the directivity of the antenna and horn of the receiver, it is possible to measure the water vapor in a local range in the sky compared with the water vapor observation by the GNSS. However, calibration using liquid nitrogen is required periodically to prevent the drift of the equipment and to measure the correct brightness temperature. Liquid nitrogen is difficult to transport and handle.

SUMMARY

It is an object of the present disclosure to provide a water vapor observation device and method that do not require calibration using liquid nitrogen and can observe water vapor in a local range.

The water vapor observation device 4 of the present disclosure includes:
processing circuitry configured to:
acquire a water vapor index calculated based on radio wave intensities of at least two frequencies among a plurality of radio waves received by a microwave radiometer;
acquire a GNSS precipitable water amount calculated based on an atmospheric delay of a GNSS signal received by a GNSS receiver;
generate a correlation data between the water vapor index and the GNSS precipitable water amount based on the water vapor index and the GNSS precipitable water amount at a plurality of time points during a predetermined period; and
calculate a precipitable water amount based on the correlation data from the water vapor index obtained based on the microwave radiometer.

The predetermined period starts from a past time point with reference to the measurement time point of the microwave radiometer used for calculating the precipitable water amount; and the predetermined period is a sliding window which slides as the measurement time point of the microwave radiometer changes.

The correlation data is obtained by a conversion equation for specifying the GNSS precipitable water amount from the water vapor index.

The conversion equation is an approximate equation generated by fitting the water vapor index and the GNSS precipitable water amount at a plurality of time points in the predetermined period.

The water vapor index is a value obtained by subtracting a second value specified based on a radio wave intensity of a second frequency higher than a first frequency from a first value specified based on a radio wave intensity of the first frequency.

The first value is the radio wave intensity of the first frequency among the plurality of radio waves; and the second value is the radio wave intensity of the first frequency in a function passing at least the radio wave intensity of the second frequency.

Since the spatial distribution of water vapor is generally gentle, if the water vapor index of the microwave radiometer, which is a measurement result of a local range, is observed for a long time, the effect of the difference from the GNSS precipitable water amount, which is a measurement result of a wide range, can be ignored. Therefore, as described above, if the correlation data is generated based on the water vapor index and the GNSS precipitable water amount at a plurality of time points in a predetermined period, the precipitable water amount can be calculated from the water vapor index using the correlation data. Mapping the microwave-radiometer-based water vapor index to the non-calibrated GNSS precipitable water vapor can convert the local water vapor data, for which there is no absolute value based on the microwave radiometer, to a reliable local water vapor data for which the absolute values match. Nevertheless, a reliable data can be obtained without calibrating the microwave radiometer with liquid nitrogen.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION

An embodiment of the present disclosure will now be described with reference to the drawings.

Figure 1:
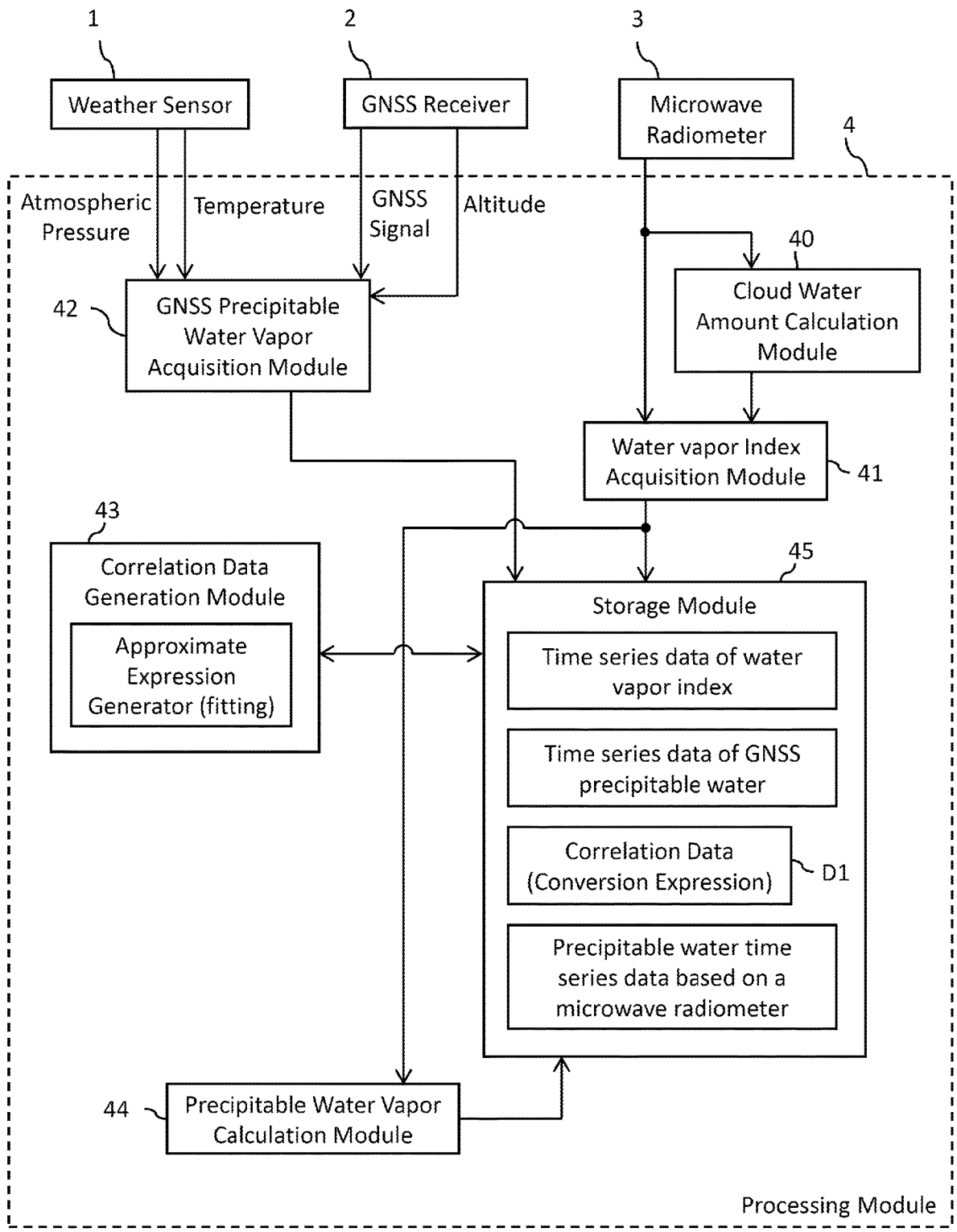
FIG. 1 is a block diagram showing a configuration of a water vapor observation device according to an embodiment.

FIG. 1 is a diagram showing a configuration of a water vapor observation device of this embodiment.

As shown in FIG. 1, the water vapor observation device includes a water vapor index acquisition module 41, a global navigation satellite system (GNSS) precipitable water vapor acquisition module 42, a correlation data generation module 43, and a precipitable water vapor calculation module 44.

Figure 3:
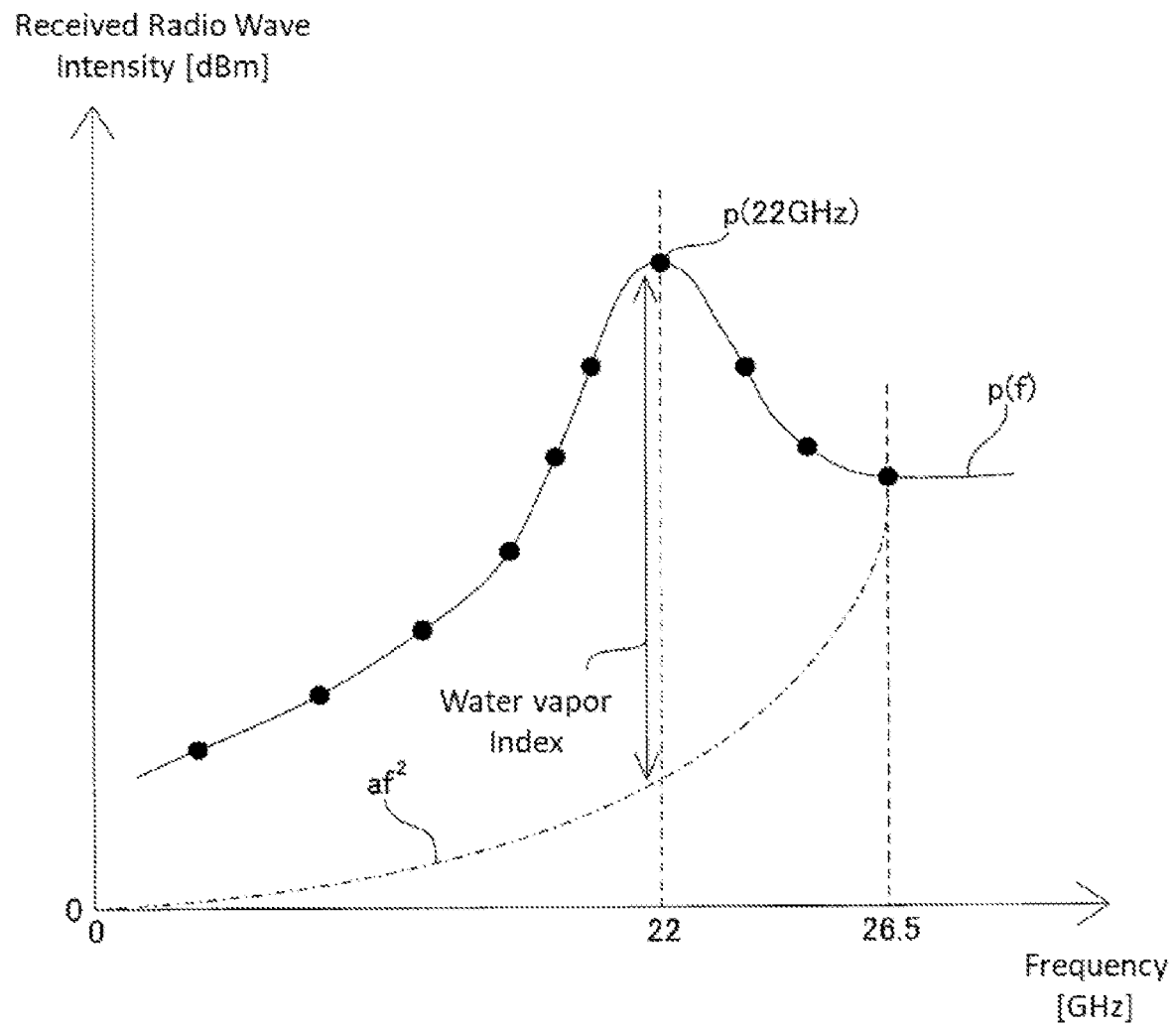
FIG. 3 shows a frequency spectrum of a radio wave intensity received by a microwave radiometer.

The water vapor index acquisition module 41 shown in FIG. 1 acquires a water vapor index calculated based on radio wave intensities of at least two frequencies among a plurality of radio waves received by a microwave radiometer 3. Although it is considered that there are various methods for calculating the water vapor index, in this embodiment, as shown in FIG. 3, a peak of the intensity of radio waves emitted from water vapor and cloud water in the sky is 22 GHz. In order to remove an amount of cloud water contained in the radio wave of 22 GHz, a cloud water amount calculation module 40 for calculating the amount of cloud water at 22 GHz based on the radio wave intensity of 26.5 GHz is provided. The water vapor index is calculated by subtracting the amount of cloud water at 22 GHz from the radio wave intensity at 22 GHz. In the present embodiment, p(f) is the received intensity of the microwave radiometer 3, and f is the frequency. As shown in FIG. 3, a model $af^2$ of the amount of cloud water is generated based on the reception intensity p (26.5 GHz) of 26.5 GHz. That is, the constant a is determined so that p (26.5 GHz)=$af^2$. The water vapor index is calculated as p (f)−$af^2$=p (22 GHz)−a (22 GHz)$^2$. The water vapor index acquired by the water vapor index acquisition module 41 is stored in a storage module 45 as a time-series data of the water vapor index.

In the present embodiment, the water vapor index is calculated by p(f)−$af^2$, but the calculation formula is not limited thereto because there are various possibilities. Since the radio wave intensity at 22 GHz is the peak of the water vapor component, and the radio wave intensity changes according to the amount of cloud water at a frequency larger than 22 GHz, and the radio wave intensity at 22 GHz contains the cloud water component, it may be utilized to remove it. That is, the water vapor index is a value obtained by subtracting the second value [a (22 GHz)$^2$] specified based on the radio wave intensity [p (26.5 GHz)] of the second frequency (26.5 GHz) higher than the first frequency (about 22 GHz) from the first value [p (22 GHz)] specified based on the radio wave intensity of the first frequency (about 22 GHz).

In other calculation methods, for example, a straight line connecting radio wave intensities of 17 GHz and 26.5 GHz may be regarded as a cloud water component, and radio wave intensities of 22 GHz in the straight line may be regarded as a cloud water component and subtracted. In FIG. 3, it is set to 26.5 GHz, but it is not necessarily set to 26.5 GHz. It is only necessary to subtract the change in the amount of cloud water and extract only the components of the water vapor spectrum. As another calculation method, an inverse problem (radiation transfer equation) may be solved and fitted using atmospheric simulation software. In this embodiment, the actuator periodically passes the blackbody through the reception range of the antenna of the microwave radiometer 3 to receive radio waves from the blackbody of known intensity and radio waves from the sky. The reception intensity p (f) of the microwave radiometer 3 is a radio wave intensity ps (f) from the sky minus a radio wave intensity pb (f) from the blackbody. Of course, the microwave radiometer 3 is not limited to this, and the mirror may be moved periodically to receive radio waves from the blackbody.

The GNSS precipitable water vapor acquisition module 42 shown in FIG. 1 acquires a GNSS precipitable water amount calculated based on an atmospheric delay (strictly, a tropospheric delay) of a GNSS signal received by a GNSS receiver 2. GNSS precipitable water (PWV); (Precipitable Water Vapor) can be calculated based on GNSS signals, coordinate values such as altitude, air temperature, and atmospheric pressure. The GNSS precipitable water vapor acquisition module 42 acquires the GNSS precipitable water amount by using the GNSS signal and altitude information obtained from the GNSS receiver 2 and temperature and atmospheric pressure obtained from a weather sensor 1. The GNSS precipitable water amount acquired by the GNSS precipitable water vapor acquisition module 42 is stored in the storage module 45 as a time series data of the GNSS precipitable water amount.

Figure 4:
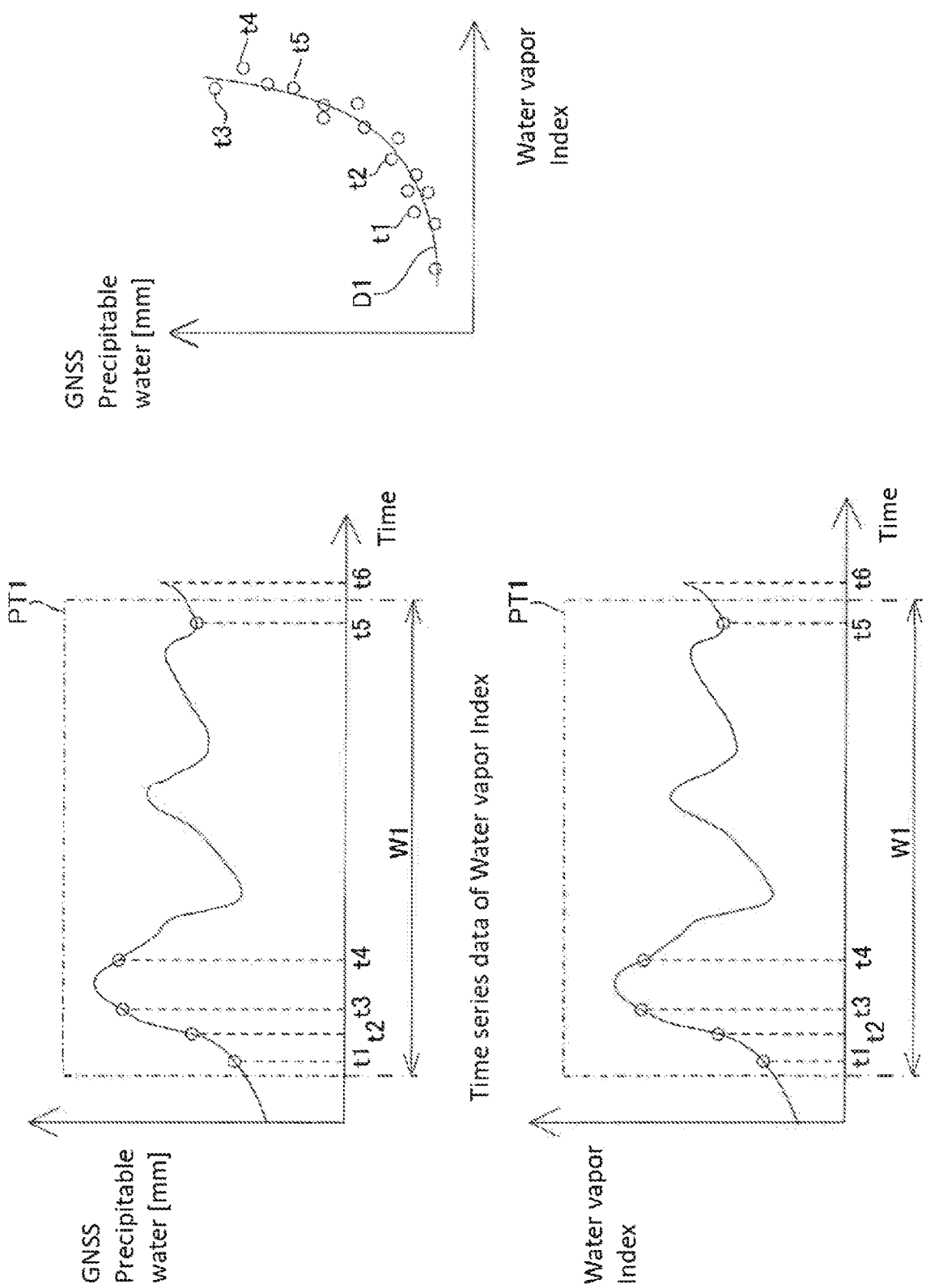
FIG. 4 shows time series data of GNSS precipitable water amount, time series data of water vapor index, and correlation data of the GNSS precipitable water amount and associated water vapor index.

The correlation data generation module 43 shown in FIG. 1 generates correlation data D1 (see FIG. 4) between the water vapor index and the GNSS precipitable water amount based on the water vapor index and the GNSS precipitable water amount at a plurality of time points during a predetermined period PT1, as shown in FIG. 4. The correlation data D1 may be any type of data as long as it can convert the water vapor index into GNSS precipitable water. The correlation data D1 may be, for example, data which represents the water vapor index and the corresponding GNSS precipitable water amount in a table format shown by a single row of records. In the present embodiment, the correlation data D1 is a conversion expression that can obtain the GNSS precipitable water amount from the water vapor index. In the present embodiment, the correlation data generation module 43 specifies coefficients of an approximate expression by fitting the approximate expression such as a linear function or a quadratic function to the water vapor index and the GNSS precipitable water amount at the plurality of time points (t1, t2, t3, t4, t5, . . . ) in the predetermined period PT1, and generates the conversion expression. In this embodiment, as shown in FIG. 4, an approximate expression D1 [GNSS precipitable water amount=b (water vapor index)$^2$+c] of a quadratic function is fitted to data at the plurality of time points in the predetermined period PT1 by the least squares method to calculate coefficients b and c, and a conversion expression is calculated. The approximate expression (conversion expression) is not limited to a quadratic function, and various expressions can be employed. The conversion expression as the correlation data D1 is stored in the storage module 45.

The precipitable water vapor calculation module 44 shown in FIG. 1 calculates a precipitable water amount from the water vapor index obtained based on the microwave radiometer 3 based on the correlation data D1 generated by the correlation data generation module 43. In this embodiment, since the correlation data D1 is a conversion expression, the water vapor index acquired by the water vapor index acquisition module 41 is substituted into the conversion expression D1 based on the microwave radiometer 3 to calculate the precipitable water amount. In this embodiment, in order to enable the calculation of the precipitable water amount in real time, the predetermined period PT1 is set to a period earlier than the measurement time point (for example, t6) of the microwave radiometer 3 used for the calculation of the precipitable water amount. Thus, as the correlation data D1 is generated using the measurement data of the past predetermined period, the precipitable water can be calculated in real time by the measurement of the microwave radiometer 3. Of course, the predetermined period PT1 may be set in a period later than the measurement time point (for example, t6) of the microwave radiometer 3 used for calculating the precipitable water amount. In this case, although the precipitable water cannot be calculated in real time, it can be used for off-line processing.

While the predetermined period PT1 may be the entire period of the measurement data, it is also possible to consider that the latest data is the most suitable to the present state, it is preferable that the predetermined period PT1 starts from a past time point for a predetermined time (W1) with reference to the measurement time point (for example, t6) of the microwave radiometer 3 used for calculating precipitable water, and the predetermined period PT1 is a sliding window which slides as the measurement time point of the microwave radiometer 3 used for calculating precipitable water changes. As described above, if the predetermined period PT1 is the sliding window, the predetermined period PT1 is the most recent period, and new data than the old data is used for the correlation between the water vapor index and the GNSS precipitable water amount, so that even if the correlation changes, the accuracy can be secured by following the change. In this embodiment, a time width W1 of the predetermined period PT1 is three months, but it is not limited to this, and may be from one to several tens of months.

As described above, the meaning of generating the correlation data D1 based on the measurement data for a predetermined period and converting the water vapor index based on the measurement by the microwave radiometer 3 to the precipitable water amount using the correlation data D1 will be described. As shown in FIG. 4, the time series data of the GNSS precipitable water amount acquired by the GNSS precipitable water vapor acquisition module 42 is data indicating an average value of water vapor in a wide range of the sky, and the accuracy of the value can be trusted. On the other hand, the time series data of the water vapor index acquired by the water vapor index acquisition module 41 is the data indicating the water vapor amount in a local range in the sky, but since the calibration by liquid nitrogen is not performed, the trend and fluctuation are reliable, but the absolute value is unreliable. The spatial distribution of water vapor is generally gentle, and it can be considered that even the water vapor in a local range almost agrees with the average value of the water vapor in a wide range when observed over a long period of time. Thus, if the correlation data D1 is generated by associating the water vapor index with the GNSS precipitable water amount at a plurality of time points in a long period (predetermined period PT1), the correlation data D1 expands or contracts the time-series graph of the water vapor index shown in FIG. 4 to become a data for conversion for matching the time-series graph of the GNSS precipitable water amount having reliability in absolute values. If the data of the water vapor index is converted based on the correlation data D1, data having variation data of water vapor amount in a local range and reliability in absolute value can be obtained.

In the present embodiment, an approximate expression as a conversion expression is calculated by fitting the water vapor index and the GNSS precipitable water amount at a plurality of time points, and the precipitable water amount is calculated from the water vapor index based on the conversion expression. That is, the water vapor index and the GNSS precipitable water amount at a plurality of points in time are used as a learning data, a learning model for outputting the corresponding precipitable water amount when the water vapor index is inputted is generated as the correlation data D1, and the precipitable water amount is outputted from the water vapor index by using the correlation data D1.

Figure 2:
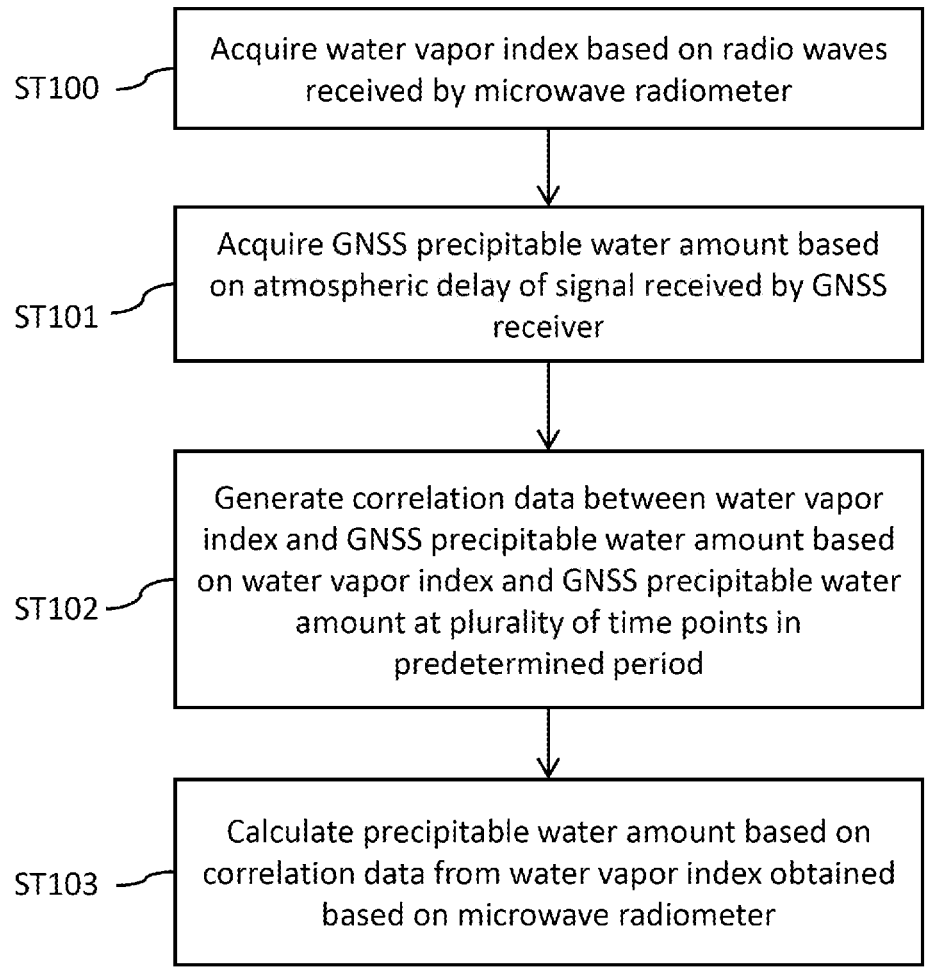
FIG. 2 is a flow chart illustrating a process performed by the water vapor observation device.

The operation of the device will be described with reference to FIG. 2. In step ST100, the water vapor index acquisition module 41 acquires a water vapor index calculated based on the radio wave intensities of at least two frequencies among the radio waves received by the microwave radiometer 3. In the next step ST101, the GNSS precipitable water vapor acquisition module 42 acquires a GNSS precipitable water amount calculated based on the atmospheric delay of the GNSS signal received by the GNSS receiver 2. Steps ST100 and ST101 are random order. In the next step ST102, the correlation data generation module 43 generates the correlation data D1 between the water vapor index and the GNSS precipitable water amount based on the water vapor index and the GNSS precipitable water amount at the plurality of time points in the predetermined period PT1. Next, in step ST103, the precipitable water vapor calculation module 44 calculates the precipitable water amount based on the correlation data D1 from the water vapor index obtained based on the microwave radiometer 3.

As described above, the water vapor observation device of the present embodiment includes:

a water vapor index acquisition module 41 which acquires a water vapor index calculated based on radio wave intensities of at least two frequencies among a plurality of radio waves received by a microwave radiometer 3;

a GNSS precipitable water vapor acquisition module 42 for acquiring a GNSS precipitable water amount calculated based on atmospheric delay of a GNSS signal received by a GNSS receiver 2;

a correlation data generation module 43 for generating correlation data D1 between the water vapor index and the GNSS precipitable water amount based on the water vapor index and the GNSS precipitable water amount at a plurality of time points during a predetermined period PT1;

a precipitable water vapor calculation module 44 for calculating a precipitable water amount based on the correlation data D1 from the water vapor index obtained based on the microwave radiometer 3.

The water vapor observation method of the present embodiment includes: A method executed by one or more processors includes:

acquiring a water vapor index calculated based on radio wave intensities of at least two frequencies among the plurality of radio waves received by a microwave radiometer 3 (ST100);

acquiring a GNSS precipitable water amount calculated based on an atmospheric delay of a GNSS signal received by a GNSS receiver 2 (ST101);

generating correlation data D1 between the water vapor index and the GNSS precipitable water amount based on the water vapor index and the GNSS precipitable water amount at a plurality of time points during a predetermined period PT1 (ST102);

calculating a precipitable water amount based on the correlation data D1 from the water vapor index obtained based on the microwave radiometer 3 (ST103).

Since the spatial distribution of water vapor is generally gentle, if the water vapor index of the microwave radiometer 3, which is a measurement result of a local range, is observed for a long time, the effect of the difference from the GNSS precipitable water amount, which is a measurement result of a wide range, can be ignored. Therefore, as described above, if the correlation data D1 is generated based on the water vapor index and the GNSS precipitable water amount at the plurality of time points in the predetermined period PT1, the precipitable water amount can be calculated from the water vapor index using the correlation data D1. Since the water vapor index based on the microwave radiometer 3 is associated with the GNSS precipitable water amount that does not require calibration, the data of local water vapor for which absolute value inaccurate based on the microwave radiometer 3 can be converted into a reliable local water vapor data for which the absolute value coincides. Then, a reliable data can be obtained without calibrating the microwave radiometer 3 with liquid nitrogen.

As in the present embodiment, it is preferable that the predetermined period PT1 is a period before the measurement time point (for example, t6) of the microwave radiometer 3 used for calculating the precipitable water amount.

In this way, since the correlation data D1 is generated using the measurement data of the past predetermined period PT1, the precipitable water can be calculated in real time from the measurement result of the microwave radiometer 3.

As in the present embodiment, it is preferable that the predetermined period PT1 starts from a past time point (W1) with reference to the measurement time point (for example, t6) of the microwave radiometer 3 used for calculating the precipitable water amount, and the predetermined period PT1 is a sliding window that slides as the measurement time point (for example, t6) of the microwave radiometer 3 used for calculating the precipitable water amount changes.

As described above, if the predetermined period PT1 is the sliding window, the predetermined period PT1 is the most recent period, and a new data than the old data is used for the correspondence relationship between the water vapor index and the GNSS precipitable water amount, so that even if the correspondence relationship changes, the accuracy can be secured by following the change.

As in the present embodiment, the correlation data D1 is preferably a conversion expression D1 for specifying the GNSS precipitable water amount from the water vapor index.

With this configuration, it becomes easy to calculate the GNSS precipitable water amount from the water vapor index.

As in the present embodiment, the conversion expression D1 is preferably an approximate expression D1 generated by fitting the water vapor index and the GNSS precipitable water amount at the plurality of time points in the predetermined period PT1.

In this way, the correlation data D1 can be generated by statistical processing, and implementation becomes easy.

As in the present embodiment, the water vapor index is preferably a value obtained by subtracting a second value [a (22 GHz)$^2$] specified based on a radio wave intensity [p (22 GHz)] of a second frequency (26.5 GHz) higher than the first frequency from a first value [p (26.5 GHz)] specified based on a radio 22 wave intensity of the first frequency.

In this way, the water vapor index can be calculated in consideration of the amount of cloud water.

The program of this embodiment is a program for causing a computer (one or more processors) to execute the method. The computer readable temporary recording medium according to the present embodiment stores the program.

Although the embodiments of the present disclosure have been described above with reference to the drawings, it should be understood that the specific configuration is not limited to these embodiments. The scope of the present disclosure is set forth not only by the description of the embodiments described above, but also by the claims, and further includes all modifications within the meaning and scope of the claims.

The structures employed in the above embodiments may be employed in any other embodiment.

The specific configuration of each part is not limited to the above-described embodiment, and various modifications can be made without departing from the scope of the present disclosure.

[Terminology]

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A water vapor observation device, comprising:
processing circuitry configured to:
acquire a water vapor index calculated based on radio wave intensities of at least two frequencies among a plurality of radio waves received by a microwave radiometer, at a plurality of time points during a predetermined period;
acquire a global navigation satellite system (GNSS) precipitable water amount calculated based on an atmospheric delay of a GNSS signal received by a GNSS receiver, at the plurality of time points;
generate correlation data between the water vapor index and the GNSS precipitable water amount; and
calculate a precipitable water amount from an additional water vapor index, acquired based on a measurement of the microwave radiometer, based on the correlation data.

2. The water vapor observation device according to claim 1, wherein
the predetermined period is a period prior to a measurement time point of the microwave radiometer used for acquiring the additional water vapor index for calculating the precipitable water amount.

3. The water vapor observation device according to claim 1, wherein
the predetermined period starts from a past time point with reference to the measurement time point of the microwave radiometer used for acquiring the additional water vapor index for calculating the precipitable water amount, and
the predetermined period is a sliding window which slides as the measurement time point of the microwave radiometer changes.

4. The water vapor observation device according to claim 2, wherein
the predetermined period starts from a past time point with reference to the measurement time point of the microwave radiometer used for acquiring the additional water vapor index for calculating the precipitable water amount, and the predetermined period is a sliding window which slides as the measurement time point of the microwave radiometer changes.

5. The water vapor observation device according to claim 1, wherein the correlation data is obtained by a conversion expression for specifying the GNSS precipitable water amount from the water vapor index.

6. The water vapor observation device according to claim 4, wherein the correlation data is obtained by a conversion expression for specifying the GNSS precipitable water amount from the water vapor index.

7. The water vapor observation device according to claim 5, wherein the conversion expression is an approximate equation generated by fitting the water vapor index and the GNSS precipitable water amount at the plurality of time points in the predetermined period.

8. The water vapor observation device according to claim 6, wherein the conversion expression is an approximate equation generated by fitting the water vapor index and the GNSS precipitable water amount at the plurality of time points in the predetermined period.

9. The water vapor observation device according to claim 1, wherein the water vapor index is a value obtained by subtracting a second value specified based on a radio wave intensity of a second frequency higher than a first frequency from a first value specified based on a radio wave intensity of the first frequency.

10. The water vapor observation device according to claim 8, wherein the water vapor index is a value obtained by subtracting a second value specified based on a radio wave intensity of a second frequency higher than a first frequency from a first value specified based on a radio wave intensity of the first frequency.

11. The water vapor observation device according to claim 9, wherein the first value is the radio wave intensity of the first frequency among the plurality of radio waves, and
the second value is the radio wave intensity of the first frequency in a function passing at least the radio wave intensity of the second frequency.

12. The water vapor observation device according to claim 10, wherein the first value is the radio wave intensity of the first frequency among the plurality of radio waves; and
the second value is the radio wave intensity of the first frequency in a function passing at least the radio wave intensity of the second frequency.

13. A water vapor observation method, comprising:

acquiring a water vapor index calculated based on radio wave intensities of at least two frequencies among a plurality of radio waves received by a microwave radiometer, at a plurality of time points during a predetermined period;

acquiring a global navigation satellite system (GNSS) precipitable water amount calculated based on an atmospheric delay of a GNSS signal received by a GNSS receiver, at the plurality of time points;

generating correlation data between the water vapor index and the GNSS precipitable water amount; and calculating a precipitable water amount from an additional water vapor index, acquired based on a measurement of the microwave radiometer, based on the correlation data.

14. The water vapor observation method according to claim 13, wherein the predetermined period is a period prior to a measurement time point of the microwave radiometer used for acquiring the additional water vapor index for calculating the precipitable water amount.

15. The water vapor observation method according to claim 14, wherein the predetermined period starts from a past time point with reference to the measurement time point of the microwave radiometer used for acquiring the additional water vapor index for calculating the precipitable water amount, and the predetermined period is a sliding window which slides as the measurement time point of the microwave radiometer changes.

16. The water vapor observation method according to claim 15, wherein the correlation data is obtained by a conversion expression for specifying the GNSS precipitable water amount from the water vapor index.

17. The water vapor observation method according to claim 16, wherein the conversion expression is an approximate expression generated by fitting the water vapor index and the GNSS precipitable water amount at the plurality of time points in the predetermined period.

18. The water vapor observation method according to claim 17, wherein the water vapor index is a value obtained by subtracting a second value specified based on the radio wave intensity of a second frequency higher than a first frequency from a first value specified based on the radio wave intensity of the first frequency.

19. The water vapor observation method according to claim 18, wherein the first value is the radio wave intensity of the first frequency among the plurality of radio waves,
the second value is the radio wave intensity of the second frequency in a function passing at least the radio wave intensity of the first frequency.

20. A non-transitory computer-readable medium having stored thereon computer-executable instructions which, when executed by a computer, cause the computer to:

acquire a water vapor index calculated based on radio wave intensities of at least two frequencies among a plurality of radio waves received by a microwave radiometer, at a plurality of time points during a predetermined period;

acquire a global navigation satellite system (GNSS) precipitable water amount calculated based on an atmospheric delay of a GNSS signal received by a GNSS receiver, at the plurality of time points;

generate correlation data between the water vapor index and the GNSS precipitable water amount; and calculate a precipitable water amount from an additional water vapor index, acquired based on a measurement of the microwave radiometer, based on the correlation data.

* * * * *